Patented July 15, 1952

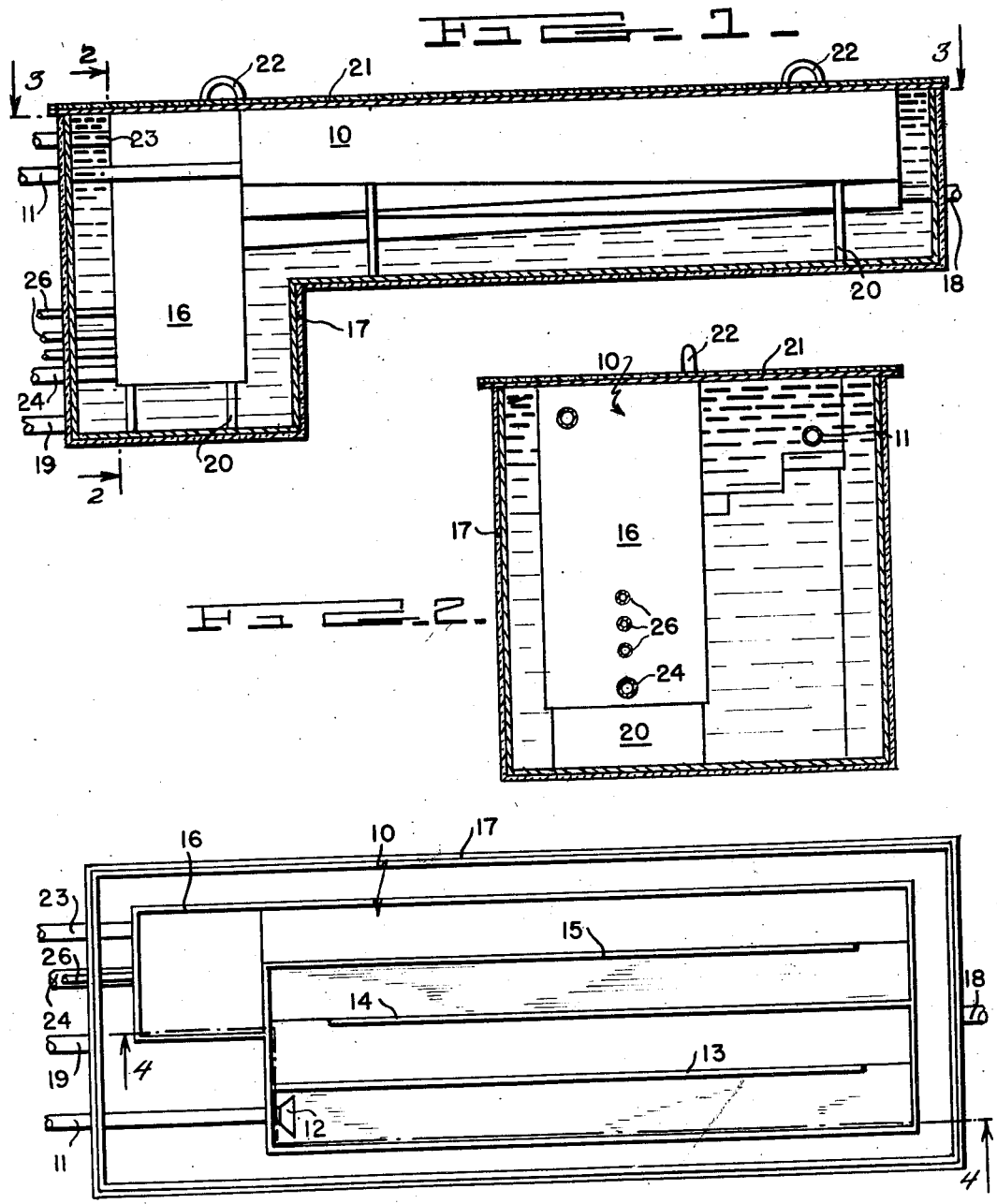

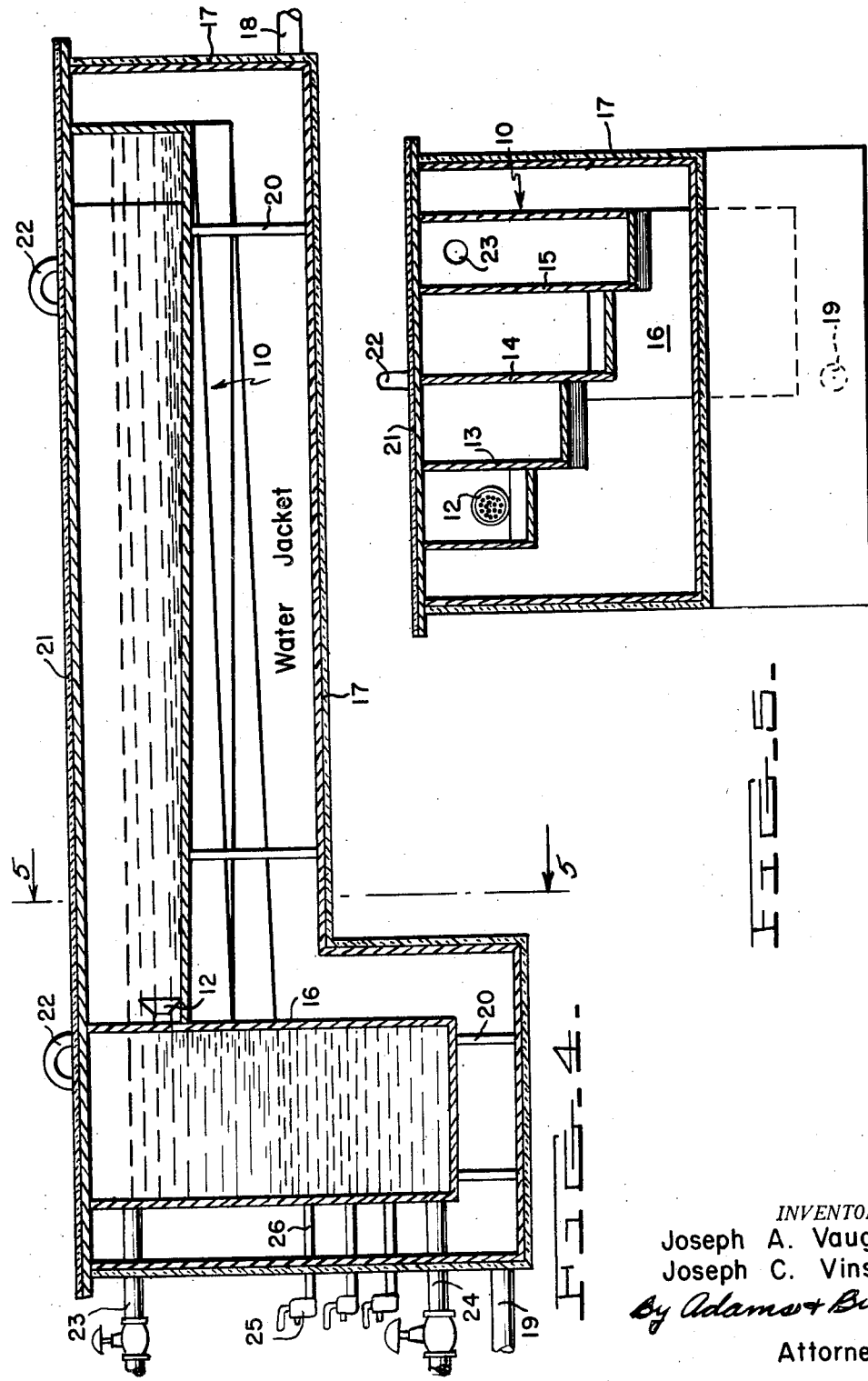

2,603,588

UNITED STATES PATENT OFFICE 2,603,588

APPARATUS FOR PARTIALLY DEHYDRATING AND CLEANSING OILY WOOD PRESERVATIVES

Joseph A. Vaughan and Joseph C. Vinson, Atlanta, Ga., assignors to Southern Wood Preserving Company, Atlanta, Ga., a corporation of Georgia Application November 26, 1948, Serial No. 61,962

4 Claims. (Cl. 196—15)

1

This invention relates to novel apparatus for and a method of removing insoluble and water-soluble matter from and simultaneously partially dehydrating oil wood preservatives, such as used creosote and the like, employed in the wood preserving industry. One of the main objects is to provide novel means for increasing the efficiency of separating tanks heretofore employed for this purpose.

Another object of the invention is to provide a novel method of expediting the separation of water-soluble and insoluble impurities contained in used creosote and other oily wood preservatives having a specific gravity greater than 1.

Still another aim is to provide a novel type of settling tank or washer provided with a continuous zig-zag trough through which a mixture or emulsion of water and the used oil preservative is caused to pass to a catch basin or sump, from which the cleansed and partially dehydrated preservative is withdrawn. The idea is to provide for relatively quiescent separation and to prevent the rising water, containing the insolubles, from conflicting with the settling preservative in the tank, thereby increasing the rate of removal of the impurities and the contained water in the emulsion.

This application is a continuation-in-part of our copending application Ser. No. 785,784, filed November 13, 1947, now abandoned.

Further aims and advantages will appear in the specification when considered in connection with the illustrative embodiment shown in the accompanying drawings, wherein:

Fig. 1 is a vertical sectional view, partly in elevation, showing a simplified form of apparatus embodying the invention;

Fig. 2 is a vertical sectional view, taken on the line 2—2 of Fig. 1;

Fig. 3 is a top plan view, taken on the line 3—3 of Fig. 1;

Fig. 4 is a vertical sectional view, taken on the broken line 4—4 of Fig. 3; and Fig. 5 is a sectional view, taken on the line 5—5 of Fig. 4.

This invention provides important improvements in the apparatus and method disclosed in U. S. Patent No. 2,314,256, to Vaughan and our Patent No. 2,314,257, both issued March 16, 1943, and our copending application Ser. No. 537,944, Patent No. 2,474,705, filed May 29, 1944, entitled Method of and Apparatus for Partially Dehydrating and Cleansing Oily Wood Preservatives.

Referring more particularly to the drawings and to the illustrated apparatus, this invention provides a settling tank or washer which takes advantage of a high ratio of surface area to volume flow of preservative to be cleansed, in order to eliminate zones in which an accumulation of suspended insoluble matter removed from the preservative may interfere with subsequent separation and settling of the cleansed and partially dehydrated oily preservative. As hereinbefore stated, the idea is to increase the rate of separation and the efficiency of tank washers, such as that shown in our aforesaid copending application, wherein an emulsion of the used preservative and water is introduced directly into a vertical tank which provides a relatively small surface area in proportion to its volume.

In accordance with the present invention, a mixture in the form of a temporary emulsion of used creosote and water, is slowly introduced into a long, inclined trough or channel of a horizontal washer tank 10 through a conduit 11 having a spray head 12 submerged in the liquid. In this instance, the washer or tank is shown as being rectangular and made of sheet metal. It has a series of staggered, vertical baffles 13, 14 and 15 welded or otherwise secured to the end walls of the washer and so arranged as to provide longitudinal alleys providing a long, zig-zag trough or channel through which the mixture passes continuously to a sump or catch basin 16 formed integral with the washer at one end and extending downwardly below the level of the last longitudinal trough. Referring to Figs. 1 and 5, the alleyways are shown as having progressively inclined bottom walls from the inlet end to permit the settled out, relatively heavy, oily preservative to flow by gravity toward the catch basin or sump. The depth of the liquid in the channel at the inlet end is preferably about three feet and, at the outlet end, about seven feet. Thus, the average depth is about five feet, which permits optimum separation of the preservative. We have found that the surface area should be not less than approximately one square foot for five cubic feet of the mixture.

The mixture or emulsion is preferably introduced at about the optimum separation temperature of 160° F. to 200° F., which has been found to be suitable for this purpose. It is also desirable to maintain the temperature of the emulsion in the entire tank substantially uniform throughout the height of the liquid to avoid convective circulation, which is detrimental to efficient separation. To this end, the entire washer, including the catch basin, is shown as being enclosed within a water jacket, herein illustrated as being in the form of an insulated tank 17 having side and end walls spaced from the walls of the washer and adapted to be kept full of warm water conveniently supplied through a conduit 18 and drained through a conduit 19, whereby the water may be circulated and maintained at a substantially uniform temperature. However, the heat may be supplied in any well known manner. The washer and catch basin are shown as being supported on suitable pedestals 20 resting on the bottom portions of the water jacket tank. To prevent heat from being dissipated through the top of the tank, the jacket tank 17 is shown as having a removable insulated cover 21 provided with handles 22, so that it can be removed to permit inspection.

As disclosed in the aforesaid patents and copending application, the separated wash water, containing the soluble and insoluble impurities which are removed from the cresote or other oily preservative, is drained from the top portion of the sump as the mixture is pumped in. In this instance, a valved drain conduit 23 is shown as being connected to the upper portion of the catch basin or at a point where the separation of the wash water has been completed. It will be understood that the input of the mixture may be controlled by automatic level-responsive means, such as that disclosed in our copending application. This, necessarily, will take into account the rate of removal of the cleansed and partially dehydrated oily preservative from the bottom of the catch basin, which is pumped out periodically.

It is also contemplated that the removal of the cleansed and partially dehydrated cresote may be controlled automatically, in response to the level of the separated preservative in the catch basin, as described in the aforesaid copending application. However, and for the sake of simplicity, the separated preservative is shown as being removed through a valved drain conduit 24, and, to enable the operator to determine the level of the separated preservative in the catch basin, a plurality of pet cocks 25 are shown as being connected by conduits 26 to the catch basin at different levels. The operator can open the pet cocks and determine, by the nature of the discharged liquid therethrough, whether the separated preservative has reached the upper level, it being much darker than the separate water. When the preservative rises to the upper level, the discharge valve is opened and the preservative is pumped or drained out into a receiving tank (not shown). Obviously, the preservative may be removed continuously under the control of an ordinary float valve (not shown).

In accordance with this invention, used creosote or hydrocarbon wood preserving oil having a specific gravity ranging between 1.02 and 1.08 is treated in the washer at a temperature of about 160° F., although the temperature may be nearly 200° F., if desired. The amount of water in the mixture, the depth, length, and floor area of the channel, and the volume and rate of flow of the oil-water mixture are all such as to insure the separation of approximately one gallon of such used preservative per hour, per square foot of surface area, of the mixture in the channel. A tank having a capacity for cleaning and separating about 600 gallons of the preservative per hour is suitable for ordinary purposes in a plant where the used, contaminated preservative has to be treated before it can be reused.

A tank for treating used preservative at the desired rate, as above set forth, has a floor area of about 16 feet by 40 feet, or 640 square feet. It is provided with at least four channels or alleys, each of which is approximately four feet wide. The depth of the mixture in the channel at the inlet is maintained at not more than about three feet while its depth at the outlet end adjacent to the sump is not more than about seven feet, so that the average depth always remains about five feet. Thus, the capacity of the channel is approximately 24,000 gallons. It is initially filled with water heated to the optimum temperature, preferably about 160° F. Then, a mixture of about equal quantities of pre-heated, used creosote and water is introduced through the spray nozzle at the rate of approximately 1200 gallons per hour and wash water is permitted to overflow from the top of the sump at the same rate. The rate of flow of the mixture in the trough is not more than about eight feet per hour which we have found to be the maximum rate at which relatively quiescent separation of the creosote will take place. Of course, the creosote immediately begins to settle to the bottom of the trough and the deposited film will flow along the inclined bottom at a faster rate than that of the mixture. After a little more than 600 gallons of settled creosote accumulates in the sump, it is removed or pumped out. Then, only about 600 gallons of wash water will be displaced and removed from the top of the sump. Thereafter, the operation is automatically stabilized, about 600 gallons of creosote and about 600 gallons of dirty wash water being removed per hour; while about 1200 gallons of used creosote and water are introduced.

The temperature of the mixture is maintained constant to avoid convective circulation and the rate of flow will be kept about constant to insure relatively quiescent separation. After the automatic operation is fully stabilized, the rate at which used creosote is introduced with fresh wash water is also maintained the same as its rate of separation and removal. We have found that the quantity of wash water should also be maintained at least about equal to that of used creosote to insure optimum separation.

It has been found that a horizontal washer of the type herein described has a capacity of nearly 15,000 gallons of creosote per day, which is adequate to satisfy the requirements of an ordinary wood preserving plant treating poles and other timber products. In accordance with this method, the contained impurities in used creosote have been reduced from about 1% to about .4% by weight, and the cleansed product is satisfactory for all purposes.

Obviously, the invention is not restricted to the particular embodiment thereof herein shown and described.

What is claimed is:

1. Apparatus for cleansing and partially dehydrating used, oily wood preservative having a specific gravity greater than 1, comprising a substantially rectangular settling tank of very large horizontal area compared with its capacity and having vertical partitions providing a continuous, zig-zag channel substantially rectangular in cross section therein adapted to be filled to a depth of an average of about five feet, with a mixture of water and oily preservative; a catch basin communicating with the outlet end of the channel into which the separated wash water and settled out preservative are discharged; a spray head connected to the inlet end of the channel near its bottom and submerged in the mixture to deliver it in the form of spray into the channel; a drain conduit for the wash water connected to the catch basin at the upper level of the mixture; and a discharge conduit connected to the bottom portion of the catch basin through which the settled out oily preservative is removed.

2. Apparaus, as set forth in claim 1, wherein the tank is substantially rectangular and the continuous channel is formed by a series of vertical baffles arranged in staggered relation.

3. Apparatus, as set forth in claim 1, wherein the depth of the channel at the inlet end is about three feet and its depth at the outlet end is about seven feet to direct the flow of the settled out oily preservative to the sump.

4. Apparatus, as set forth in claim 1, wherein the width of the channel is such that the surface area of the mixture therein is not less than approximately one square foot for every five cubic feet of the mixture.

JOSEPH A. VAUGHAN.
JOSEPH C. VINSON.

REFERENCES CITED

The following references are of record in the file of this patent:

UNITED STATES PATENTS

| Number | Name | Date |
| --- | --- | --- |
| 499,583 | Powers | June 13, 1893 |
| 717,565 | Von Gernet | Jan. 6, 1903 |
| 719,319 | Forbes et al. | Jan. 27, 1903 |
| 1,102,553 | Seubert | July 7, 1914 |
| 2,314,256 | Vaughan | Mar. 16, 1943 |
| 2,314,257 | Vaughan et al. | Mar. 16, 1943 |